United States Patent [19]

Collette

[11] Patent Number: 4,601,865

[45] Date of Patent: Jul. 22, 1986

[54] CONTROLLED FEED OF STABILIZING ROD ASSOCIATED WITH CONTROLLED APPLICATION OF BLOWING GAS

[75] Inventor: Wayne N. Collette, Westmoreland, N.H.

[73] Assignee: The Continental Group, Inc., Stamford, Conn.

[21] Appl. No.: 420,055

[22] Filed: Sep. 30, 1982

Related U.S. Application Data

[62] Division of Ser. No. 250,495, Apr. 2, 1981, Pat. No. 4,372,735.

[51] Int. Cl.$^4$ .................... B29C 49/12; B29C 49/18
[52] U.S. Cl. .................... 264/40.3; 264/529; 264/532
[58] Field of Search .................... 264/40.3, 529, 532; 425/135, 161, 162, 522, 529, 530, 535; 65/161

[56] References Cited

U.S. PATENT DOCUMENTS

| | | | |
|---|---|---|---|
| 3,244,778 | 4/1966 | Ninneman | 264/529 |
| 3,412,188 | 11/1968 | Seefluth | 264/532 X |
| 3,865,530 | 2/1975 | Lallee et al. | 425/529 |
| 4,035,455 | 7/1977 | Rosenkranz et al. | 264/40.3 |
| 4,042,657 | 8/1977 | Ostapchenko et al. | 264/532 X |
| 4,151,250 | 4/1979 | Barry et al. | 264/529 X |
| 4,196,165 | 4/1980 | Michel | 264/532 X |

*Primary Examiner*—Jan Silbaugh
*Attorney, Agent, or Firm*—Charles E. Brown

[57] ABSTRACT

A blow molding operation wherein centering rods are associated with preforms at least during the initial portion of the blowing cycle wherein the preforms are primarily axially elongated and wherein the freely suspended lower end of each preform must be guided against radial movement. In order to assure that the associated preform centering rods will remain in centering position with respect to the preforms at all times and will not engage the preforms so as axially to stretch the preforms, a control is provided for coordinating the advance of the preform centering rods with the introduction of blowing gas into the preforms, and thus with the axial elongation of the preforms due to internal blowing pressure.

3 Claims, 2 Drawing Figures

CONTROLLED FEED OF STABILIZING ROD ASSOCIATED WITH CONTROLLED APPLICATION OF BLOWING GAS

This is a division of Ser. No. 250,495, filed Apr. 2, 1981, now U.S. Pat. No. 4,372,735.

This invention relates in general to new and useful improvements in the blow molding of articles, and more particularly to the blow molding of articles from preforms which are supported at one end only and which are axially elongated in the forming of the articles.

When a preform is being blow molded within a blow mold, it has a tendency to shift from a centered position relative to the axis of the mold. Accordingly, it is known to use a preform centering rod which lightly engages the closed portion of the preform to maintain the preform in a centered position. While in certain instances the centering rod is also utilized as a stretch rod and serves axially to elongate the preform prior to the introduction of a blowing gas, the centering rod performs no stretching function and must be advanced by a rate corresponding to the axial elongation of the preform by the molding gas. This invention particularly relates to a control mechansim for controlling the actuation of valves which control the flow of the blowing gas into the preform in accordance with the position of the preform centering rod so as to maintain the centering rod in an operative position at all times without the centering rod effecting an axial stretching of the preform.

Most particularly, in accordance with this invention the valves which control the flow of blowing gases are actuated in accordance with the position of the preform centering rod by mounting a plurality of control devices of the sensing type adjacent the mechanism for advancing the preform centering rods and providing a control member on the mechanism with the control member being movable along the line of sensing devices sequentially to actuate the sensing devices in accordance with the position of the preform centering rod.

It is to be understood that the position of the centering rod relative to the preform greatly influences the material distribution in the final container. Proper distribution of available material permits the optimum use of the material, and therefore permits the blow molding of a bottle having the desired strength characteristics utilizing a minimum weight of material. When the centering rod velocity or position versus time is independent of flow valve actuation, there is improper control of the stretching of the preform. However, by maintaining the centering rod in proper contact with the preform at all times during the blow molding operation, a maximum influence may be maintained on material distribution and a minimum bottle weight may be obtained.

With the above and other objects in view that will hereinafter appear, the nature of the invention will be more clearly understood by reference to the following detailed description, the appended claims, and the several views illustrated in the accompanying drawings.

IN THE DRAWINGS

Figure 1:
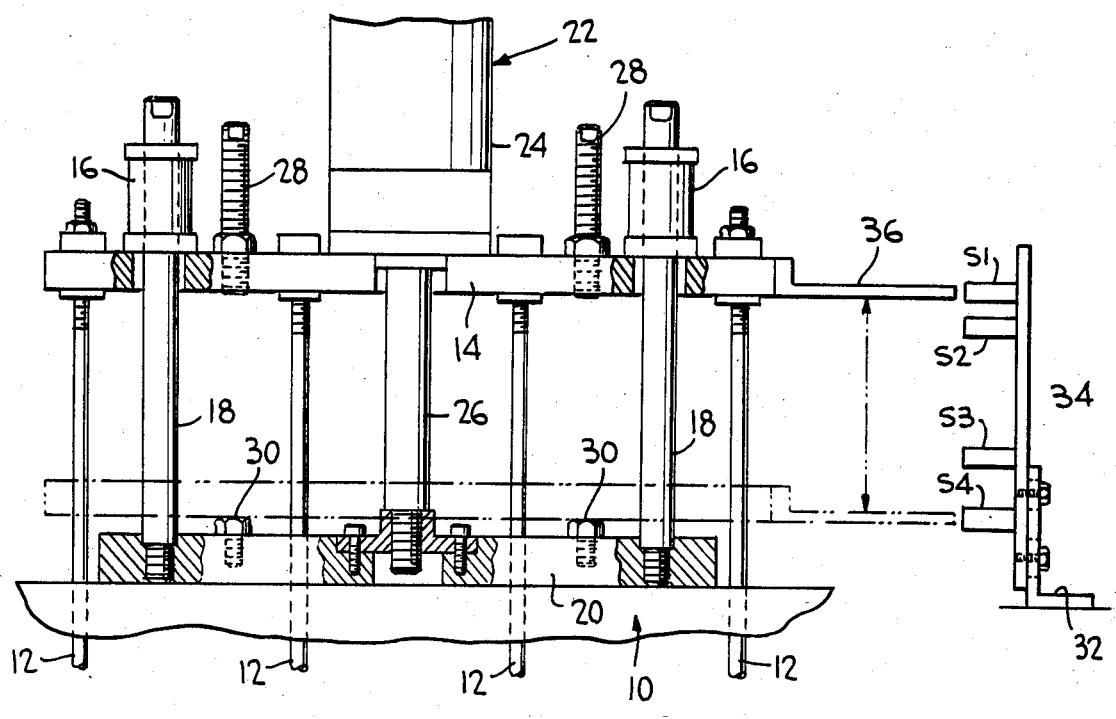
FIG. 1 is an elevational view with parts broken away and shown in section of an upper part of a blow molding machine, and shows particularly the provision of a cross bar which carries the preform centering rods and control unit associated therewith.

Reference is made to FIG. 1 wherein there is provided a blow molding unit 10 which will be of a conventional type and which, in the illustrated embodiment, will have four blow molding cavities (not shown). These blow molding cavities will, in a conventional manner, have positioned therein preforms. In the case of the article being blow molded being a bottle, preferably the preform will have a neck which is engaged by suitable support means with the preform in each mold cavity depending from the neck support.

Each blow mold cavity has associated therewith a preform centering rod 12 over which, when the preform is positioned within the blow mold, the preform will be telescoped with the lower end of the centering rod being spaced from the inner lower end of the preform prior to downward rod motion. Contact with the preform is made during down motion of the centering rod.

In the illustrated form of the invention, the preform centering rods 12 are carried by a cross bar 14 to which the upper end of each of the centering rods 12 is adjustably secured. However, the entering rods could be separately actuated. The cross bar 14 is mounted for guided movement relative to the mold assembly by way of guide sleeves 16 mounted on guide rods 18, which, in turn, are carried by a support bar 20 suitably secured to the top of the mold assembly 10.

The cross bar 14 and the preform centering rods 12 are vertically advanced by way of a suitable drive unit 22 which is operable at controlled different rates and is illustrated as being in the form of a fluid motor, either hydraulic or pneumatic, which includes a cylinder 24 and a piston rod 26. The drive unit could also be a mechanical unit. The cylinder 24 is suitably secured to the cross bar 14 while the piston rod 26 is secured to the mounting bar 20.

The lowermost position of the cross bar 14 is controlled by way of adjustable stop members 28 which are engageable with heads of fasteners 30 carried by the mounting bar 20. The upper position of the cross bar 14 will be controlled in a manner to be described hereinafter.

There is also suitably mounted by way of a mounting bracket 32 a vertical support 34. The mounting bracket 32 may, for example, be mounted on the top of the mold assembly 10. The vertical support 34 carries four vertically spaced proximity switches S1, S2, S3 and S4.

In order that the proximity switches may be actuated in times sequence, there is carried by the cross bar 14 an actuator 36 for the proximity switches.

The proximity switch S1, in a manner which forms no part of this invention, indicates the uppermost position of the cross head 14. The proximity switch S2 controls a blow control valve for introducing a first blowing gas, i.e. a gas at a pressure on the order of 200 p.s.i., into the preform. The use of a low pressure blowing gas is optional and when not used the switch S2 will not be required. The proximity switch S3 controls a conventional valve which controls the flow of a high pressure blowing gas, i.e. a gas at a pressure on the order of 600 p.s.i., into the preform. Finally, the proximity switch S4 indicates when the cross head 14 and the preform centering rod 12 are at their lowermost position, and, if desired, may also provide for the automatic return of the cross head 14 and the preform centering rod 12 to their uppermost positions.

Figure 2:
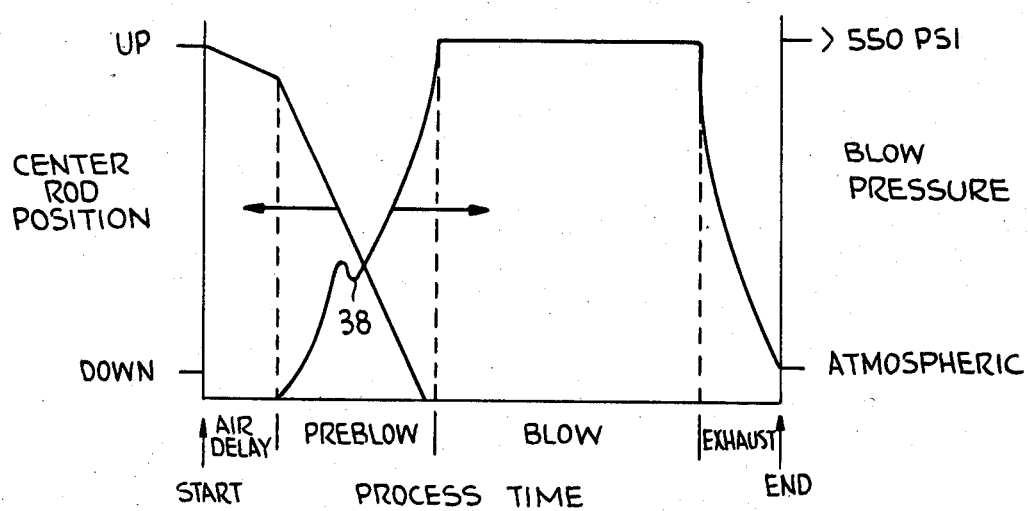
FIG. 2 is a graph plotting preform centering rod position against blowing gas actuation and pressure.

Referring now to the graph of FIG. 2, it will be seen that when the blow molding assembly 10 is actuated, the fluid motor 22 will be actuated and there will be an initial downward movement of the cross head 14 and the preform centering rods 12 so that the extreme lower end of each preform centering rod will be moved to a position touching the associated preform. The rate of downward movement of the centering rods is retarded by the resistance of the preform. At this time, the actuator 36 is aligned with the switch S2 and actuates the same to direct the low pressure blowing gas into the preforms.

At the same time, the downward movement of the preform centering rods 12 increases due to the decrease in the resistance of the preforms and the centering rods are moved downwardly into the respective mold cavities at that rate or substantially equal to but slightly less than the rate which the preform axially elongates under the influence of the blowing gas. At this time the stretching of the preform, both hoop and axial, is due solely to the gaseous pressure.

It will be seen by the slight dip in the pressure within the preform as identified by the reference numeral 38, that when the low pressure blowing gas supply is discontinued and the high pressure gas is introduced, there will be a slight reduction of blowing pressure within the preform due to rapid expansion of the preform at a rate greater than that at which the blowing gas is supplied. It is possible to eliminate this dip. It is to be noted that the slope of the centering rod curve will vary with the rod driving force and the preform resistance.

The pressure of the blowing gas in the preform then continues to the maximum and reaches the maximum pressure at about the same time as the preform centering rods 12 reach their lowermost positions. Thereafter, the pressure within the preform does not increase, but the preform is fully radially expanded to conform to the configuration of the mold. At this time, preferably, the preform centering rods 12 remain in their lowermost position, but it is feasible within this invention for the switch S4 to effect a reverse actuation of the fluid motor 22 and a withdrawal of the preform centering rods 12 so that once the bottle blowing operation has been completed, the centering rods 12 are fully retracted and the blown bottles can be readily discharged from their respective mold cavities. Of course, the blowing pressure within the blown articles (bottles) will have to be greatly reduced before the mold cavities are opened, as is shown by the right-hand part of the graph.

Although only a preferred embodiment of the means for effecting a controlled introduction of blowing gas into a preform has been specifically illustrated and described herein, it is to be understood that minor variations may be made in the control mechanism without departing from the spirit and scope of the invention as defined by the appended claims.

I claim:

1. A method of coordinating the axial stretching of a preform in a blow molding operation with the position of a preform centering rod, said method comprising the step of advancing a preform centering rod from a retracted position to a position substantialy touching or touching a bottom interior of a preform suspended in a blow mold, and then supplying a blowing gas under prressure to the interior of the preform to effect axial elongation of the preform at an axial rate while advancing the preform centering rod at the same axial rate, the position of the preform centering rod being used as the means for initiating and controlling the supplying of blow gas to the preform.

2. The method of claim 1 wherein said blowing gas is optionally supplied in two separate steps each at a different pressure and each step under the control of the position of the preform centering rod.

3. The method of claim 2 wherein the rate of axial elongation of the preform is generally constant under the two blowing steps.

* * * * *